United States Patent [19]

Ehlers

[11] Patent Number: 4,524,528
[45] Date of Patent: Jun. 25, 1985

[54] WIND POWERED GRAIN DRYING APPARATUS

[76] Inventor: Thomas G. Ehlers, 1875 Adair, Dubuque, Iowa 52001

[21] Appl. No.: 464,816

[22] Filed: Feb. 8, 1983

[51] Int. Cl.³ .............................................. F26B 13/22
[52] U.S. Cl. ....................................... 34/102; 34/181; 414/327
[58] Field of Search ................ 34/102, 181, 182, 183; 198/508, 509; 414/327

[56] References Cited

U.S. PATENT DOCUMENTS 2,207,360 7/1940 Spellacy ................................ 34/102
2,649,215 8/1953 Dickson ............................... 414/317
3,357,110 12/1967 Burgin ................................... 34/102

Primary Examiner—Larry I. Schwartz
Attorney, Agent, or Firm—William H. Wright

[57] ABSTRACT

This invention relates to solar grain drying apparatus in general, and more specifically to a windmill powered grain circulating conveyor mechanism used in conjunction with a solar heat source to accomplish a slow uniform drying of the contents of a grain bin; and having a unique conveyor support and rotation imparting mechanism, that insures that the grain lifted from the bottom of the grain bin, will be uniformly distributed around the periphery of the bin to promote the drying process.

10 Claims, 4 Drawing Figures

WIND POWERED GRAIN DRYING APPARATUS

BACKGROUND OF THE INVENTION

This application is an improvement over my now abandoned patent application, Ser. No. 294,957, filed Aug. 21, 1981, entitled "WIND POWERED SOLAR GRAIN DRYING APPARATUS".

In order to remove moisture from grains and cereals, it is necessary to raise the temperature of the kernals, to drive the moisture to the surface, where it can escape into the atmosphere. To this end, most prior art grain drying bins have been supplied with a heat source and forced ventilation means, both of which consume tremendous amounts of power, in the form of fuel and/or electricity.

Since the cost of fuel and electricity has been rapidly escalating in the past, and should continue to do so in the foreseeable future, people have been looking for alternative energy sources to utilize in the grain drying process. Examples of such alternate energy source devices may be seen in U.S Pat. Nos. 2,045,800; 4,207,684 and 4,077,143.

Unfortunately, even these devices consume energy to circulate air and/or to tumble the grain within the bin, so that the drying process takes place uniformly within the bin, and also to insure that the presence of mold is inhibited or eliminated.

In addition, other prior art patents, such as U.S. Pat. Nos. 3,913,239 and 3,357,110, which have employed a vertical conveyor which deposits the grain onto a conical skirt member, to distribute the elevated grain around the periphery of the bin, have been patently deficient in preventing the grain from accummulating unevenly around the bin periphery, except under ideal conditions, and in instances wherein the conveyor outlet is positioned so that the center of the stream of grain exactly coincides with the apex of the conical skirt.

Up until the present time no one has devised a grain drying apparatus which relies solely on naturally available and virtually inexhaustable power supplies, i.e.—the sun and wind. The present invention, however, recognizes these power sources, and incorporates them into a very efficient grain drying apparatus.

In addition, this invention also provides a fool proof, wind powered apparatus, for insuring that the grain will be uniformly distributed around the periphery of the grain bin interior.

SUMMARY OF THE INVENTION

An object of the present invention is the provision of a grain drying apparatus, which does not consume fossil fuels, gas or electricity to remove moisture from grains or cereals.

Another object of the instant invention is the provision of a grain drying apparatus, which utilizes solar power to heat the grain, to drive moisture form the kernals, and wind power to circulate the grain, to prevent mold, and evenly distribute the heat within the bin.

Still another object of the instant invention is the provision of a grain drying apparatus, which utilizes a windmill powered conveyor system to circulate the grain within the bin.

A further object of the present invention is the provison of a grain drying apparatus, which utilizes a passive solar system to heat the kernals.

A still further object of the instant invention is the provision of a grain drying apparatus, which utilizes the exterior of the grain bin as a passive solar collector element.

Yet another object of the present invention is the provision of a unique conveyor support, and wind powered rotation mechanism, that will insure that the grain lifted from the bottom of the bin will be uniformly distributed around the bin periphery, as it exits from the conveyor system.

These and other objects, advantages and novel features of the invention will become apparent when viewed in conjunction with the detailed description which follows and the accompanying drawings.

BRIEF DESCRIPTION OF THE PREFERRED EMBODIMENT

DETAIL DESCRIPTION OF THE PREFERRED EMBODIMENT

Figure 1:
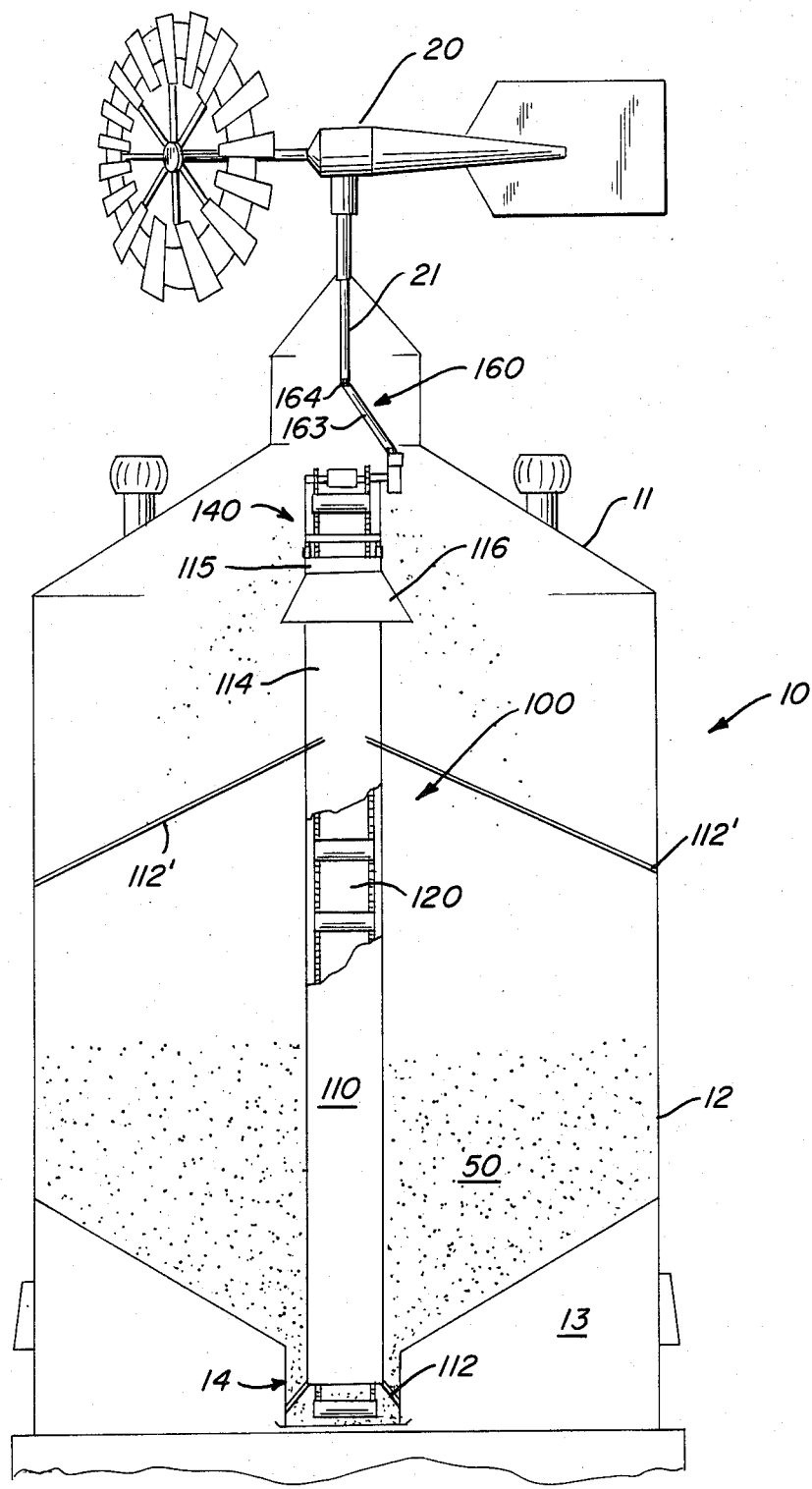
FIG. 1, is a side elevation view of the preferred embodiment installed in a grain bin.

As can best be seen by reference to FIG. 1, the wind powered grain conveying system that forms the basis of the present invention is designated generally as 100. The conveying system 100 is intended for use in conjunction with a grain bin 10, having a roof portion 11, supported by a walled member 12, which surrounds a downwardly sloping floor member 13, having a centrally disposed recess 14, which forms a grain sump.

The power supply for the conveyor system 100, is provided by a windmill member 20, mounted on roof 11, and having a downwardly depending output shaft 21, which extends into the interior of the grain bin 10.

Turning now specifically to the conveyor system 100, as can best be seen be reference to FIG. 1, the conveyor system 100, comprises in general an elongated conveyor support conduit 110, an elongated conveyor member 120, an external wheeled conveyor support mechanism 140, and a power take-off mechanism 160, which connects the conveyor system 100, to the windmill member 20.

The conveyor support conduit 110, comprises an elongated cylindrical conduit 111, having a plurality of support legs 112, disposed on its lower end 113, for supporting the lower end of the conduit in the grain sump; but spaced from the bottom of the recess 14, in the grain bin floor 13. In addition, to the support legs 112, the conduit may also be provided with additional support arms 112', whose purpose is to support the conduit, in its vertical disposition within the grain bin interior, in a well recognized manner.

The upper end 114, of the conduit 110, is further provided with a cap member 115, and an outwardly flared downwardly depending conical skirt member 116. The cap member 115 forms a bearing race for the wheeled conveyor support mechanism 140, and the skirt member 116, provides a deflector surface to distribute the grain exiting from the conveyor system, uniformly around the interior of the grain bin.

Figure 2:
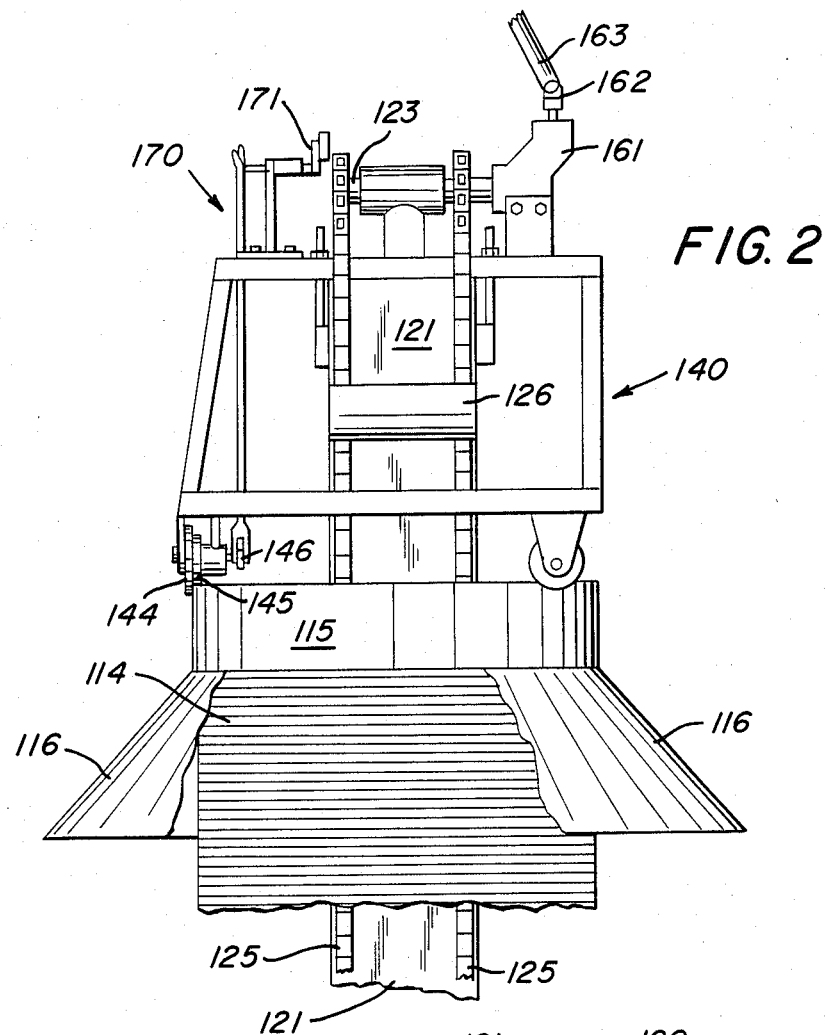
FIG. 2, is an enlarged detail view of the upper section of the elevator mechanism illustrated in FIG. 1.
Figure 3:
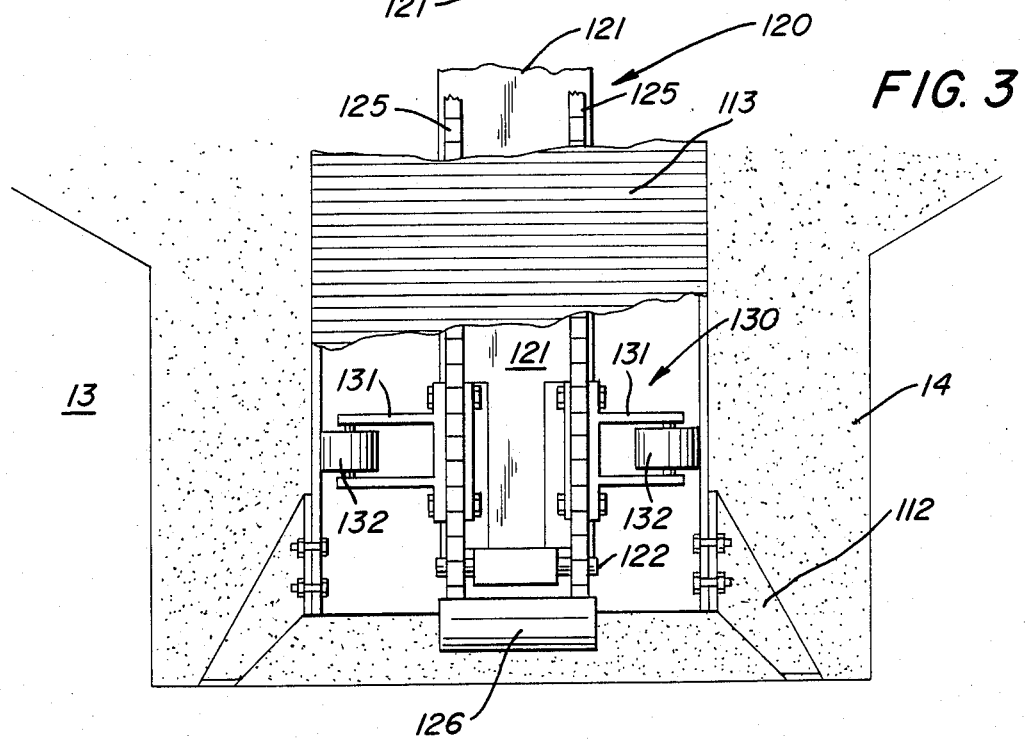
FIG. 3, is an enlarged detail view of the lower portion of the elevator mechanism illustrated in FIG. 1.

As can best be seen by reference to FIGS. 2 and 3, the elongated conveyor member 120, comprises a generally rectangular elongated rigid support element 121, which has axles 122, 123 disposed on either end. The axle 122, 123 each have a pair of sprocket wheels 124, disposed on their respective ends, which rotatably support a pair of conveyor chains 125, in a well recognized manner. In addition, a plurality of conveyor buckets 126, are disposed along, and suspended between the conveyor chains 125, at regularly spaced intervals.

Referring specifically to FIG. 3, it can be seen that internal rolling conveyor support means 130 are provided on the interior of the lower conduit portion 113, which allows the conveyor member 120, to rotate within the elongated conduit 110. The rolling conveyor support means 130, comprise a plurality of outwardly extending flanges 131, which rotatably support a plurality of roller elements 132, which are axially aligned, and in rolling contact with the interior walls of the conduit.

Figure 4:
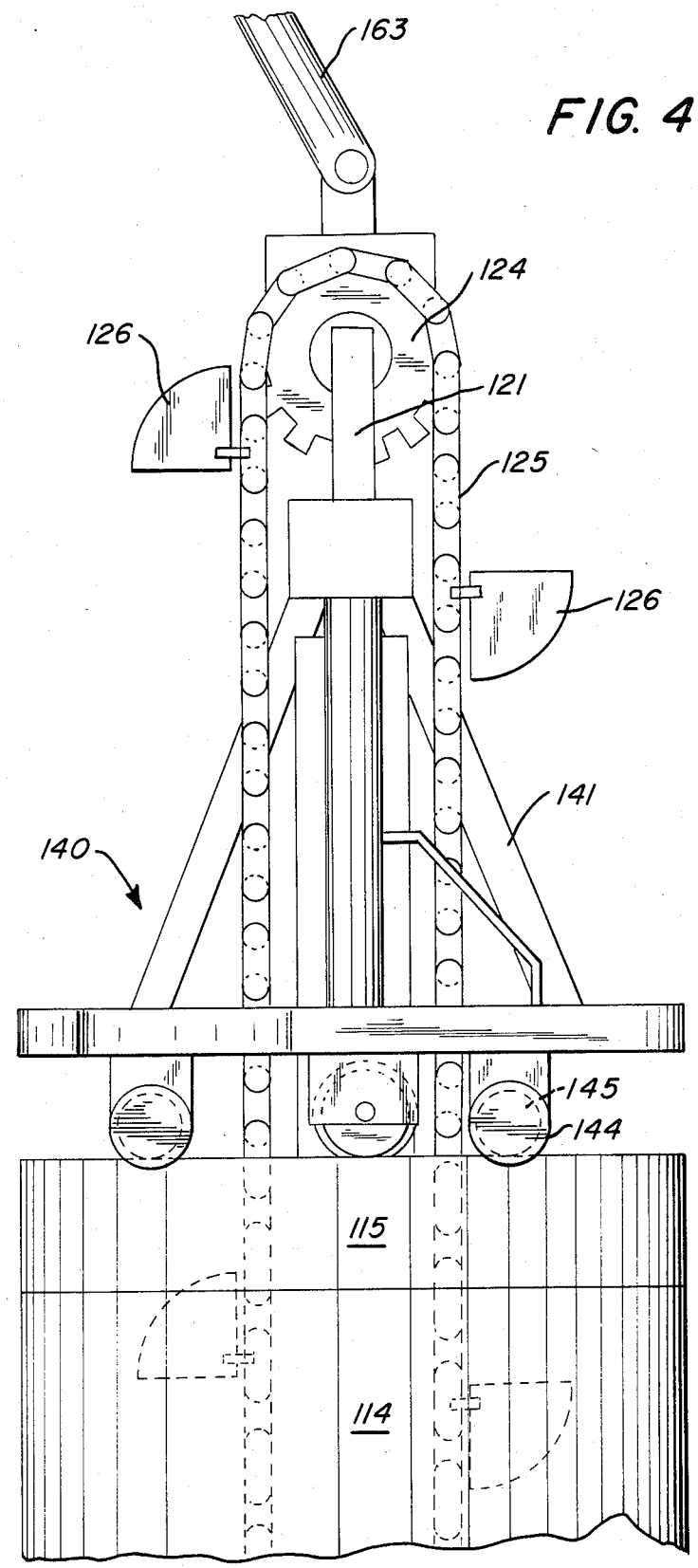
FIG. 4, is an enlarged detail view of the upper portion of the elevator mechanism rotated 90°.

The upper portion of the conveyor system 100, is illustrated in detail in FIGS. 2 and 4, and as can be seen therein; the external wheeled conveyor support mechanism 140, comprises a support framework 141, connected on one end to a base member 142, having a plurality of stepped wheel elements 143, disposed around its periphery.

As can best be seen in FIG. 2, the stepped wheel elements 143, are provided with an enlarged outer wheel portion 144, and a reduced diameter inner wheel portion 145. The outer wheel portion 144, extends beyond and below the periphery of the cap member 115. The inner wheel portion 145 rests on the periphery of the cap member 115, and is in rolling contact therewith. Furthermore, the placement of the stepped wheel elements 143, around the periphery of the base member 142, will insure that the external wheeled conveyor support mechanism 140, will remain in place on the cap member 115, by virtue of the engagement of the sides of the cap member with the internal surface of the outer wheel portion.

The other end of the support framework 141, is rigidly connected to, and acts as a suspension support for, the upper end of the generally rectangular rigid support element 121, and its dual chain and sprocket arrangement. In addition, the upper sprocket axle 123 is operatively connected on one end to the output shaft of the windmill 20, via the power take-off mechanism 160.

The power take-off mechanism 160, comprises a gearing mechanism 161, connected on one end to the upper sprocket axle 123, and on the other end to a universal joint 162. The universal joint 162, is disposed on one end of a linkage 163, which has its other end connected to the output shaft 21, of the windmill, via another universal joint 164.

In addition, to the primary windmill power take-off mechanism 160, for driving the conveyor member 120, about a horizontal axis: the conveyor system 100 is further provided with a secondary conveyor power take-off mechanism 170, that is used to drive the external wheeled conveyor support mechanism 140, to impart rotary motion to the conveyor member about a vertical axis.

This secondary conveyor power take-off mechanism 170, comprises a gear and linkage assembly 171, which is operatively connected to at least one of the sprocket chains 125, for imparting rotary motion to at least one of the stepped wheel axles 146, for driving the external wheeled support member 140, around the cap member 115.

Having thereby described the structural components that comprise the conveyor system, the operation and cooperation of the respective parts will be explained in detail.

After the most kernals have been introduced into the grain bin 10, the windmill 20 is engaged to produce a rotary output which is in turn transmitted to the primary take-off mechanism 160, to drive the chain conveyor belt and bucket arrangement in a rotary path around a horizontal axis. The individual empty conveyor buckets 126, travel downwardly through the conduit 110, until they engage the mass of grain 50, that has accummulated in the grain sump; whereupon, they become filled with grain and continue upwardly on their closed loop path. As the filled buckets reach the apex of their journey, the grain contained within the individual buckets is expelled, by the combined action of gravity and centrifugal force. These two forces are sufficient to propel the individual grains beyond the periphery of the cap member 115, and insure that a significant portion of the grain will strike the conical skirt to further enchance the distribution and dispersion of the individual kernals. While the individual conveyor buckets are being rotated about the horizontal axis, the conveyor member as the whole is also being driven about a vertical axis, by virtue of the rotary motion imparted to the external wheeled conveyor support member through the secondary power take-off mechanism 170.

In order to insure the uniform distribution of grain within the grain bin, the gearing employed in the primary and secondary power take-off mechanisms is chosen so that the speed of rotation about the horizontal axis is substantially greater than the speed of rotation about the vertical axis. The specific relationship between the respective speeds of rotation is not set forth herein, due to the fact that the ratios will change depending on the number of buckets employed on the conveyor. It will be sufficient to practice this invention, if there is a uniform horizontal angular displacement between the successive bucket discharges.

It should also be noted that this particular structural arrangement allows the conveyor member 120 to be withdrawn from the conveyor support conduit 110, for the purpose of maintenance and repair. This act can be accomplished even when the grain bin is full and the conveyor member can be removed and reinserted without disturbing the accummulated grain.

Having thereby disclosed the subject matter of this invention, it would be obvious that many substitutions, modifications and variations of the invention are possible in light of the above teachings. It is therefore to be understood that the invention as taught and described in only to be limited to the extent of the breadth and scope of the appended claims.

What I claim is:

1. In a grain bin having a roof portion, a walled portion, and a sloping floor forming a grain sump, an improved wind powered grain drying apparatus comprising:
   a windmill mounted on said roof portion, and having an output shaft extending into the interior of said grain bin,
   an elongated conduit disposed in said grain bin, having one end disposed in, but spaced from the grain sump floor, and the other end disposed in the general vicinity of said output shaft, wherein the said other end of said elongated conduit is provided with a cap member and a downwardly depending conical skirt, and a conveyor system operatively connected to said output shaft, and comprising a conveyor member mounted in said elongated conduit for raising grain through said elongated conduit and means for rotating said conveyor as a whole about a vertical axis extending along the axis of said elongated conduit.

2. An improved wind powered grain drying apparatus as in claim 1; wherein, said conveyor system further comprises:
an external wheeled conveyor support mechanism mounted for rotation about said cap member.

3. An improved wind powered grain drying apparatus as in claim 2; wherein, said conveyor support mechanism comprises:
a support framework connected on one end to a base member having a plurality of stepped wheel elements disposed around its periphery.

4. An improved wind powered grain drying apparatus as in claim 3; wherein, said conveyor member comprises:
an elongated rigid support element having axles disposed on both ends, and each axle is provided with a pair of sprocket wheels, which rotatably support a pair of conveyor chains that have a plurality of conveyor buckets suspended between them.

5. An improved wind powered grain drying apparatus as in claim 4; wherein,
the said support framework is connected to the axle on the upper end of the rigid support element, and one end of the axle is operatively connected to the output shaft of the windmill for driving the conveyor member about a horizontal axis.

6. An improved wind powered grain drying apparatus as in claim 5; wherein,
the axle on the upper end of the rigid support element is operatively connected to the said output shaft through a primary power take-off mechanism.

7. An improved wind powered grain drying apparatus as in claim 6; wherein, the primary power take-off mechanism comprises:
a gearing mechanism connected on one end to the upper axle and on the other end to a universal joint, which is in turn connected to a linkage element which is connected to the output shaft through another universal joint.

8. An improved wind powered grain drying apparatus as in claim 6; wherein,
at least one of the stepped wheels on the support mechanism is provided with a secondary power take-off mechanism for importing rotary motion to said at least one of the stepped wheels.

9. An improved wind powered grain drying mechanism as in claim 8; wherein, said secondary power take-off mechanism comprises:
a gear and linkage assembly connected to at least one of the conveyor chains for imparting rotary motion to said at least one of the stepped wheels, for driving the external wheeled support member around the said cap member, and about a vertical axis.

10. An improved wind powered grain drying apparatus as in claim 4; wherein, said conveyor system further comprises:
an internal rolling conveyor support means comprising a plurality of roller elements connected to the lower end of the rigid support element and disposed in rolling contact with the interior walls of said conduit to facilitate the rotation of the conveyor member about the vertical axis.

* * * * *